(12) United States Patent
Meguro et al.

(10) Patent No.: US 6,195,123 B1
(45) Date of Patent: Feb. 27, 2001

(54) METHOD OF AUTOMATICALLY ADJUSTING A CRT COLOR MONITOR SCREEN AND A CRT COLOR MONITOR

(75) Inventors: Takeyuki Meguro, Niigata-ken; Mitsugi Yui, Saku, both of (JP)

(73) Assignee: Totoku Electric Co., Ltd., Tokyo (JP)

( * ) Notice: Subject to any disclaimer, the term of this patent is extended or adjusted under 35 U.S.C. 154(b) by 0 days.

(21) Appl. No.: 09/047,898

(22) Filed: Mar. 25, 1998

(30) Foreign Application Priority Data

Oct. 9, 1997 (JP) .................................................... 9-276942

(51) Int. Cl.[7] .............................. H04N 17/02; H04N 3/22
(52) U.S. Cl. ............................ 348/190; 348/747; 348/806
(58) Field of Search .................................. 348/190, 745, 348/746, 747, 806, 807; H04N 17/02, 3/22, 3/23

(56) References Cited

FOREIGN PATENT DOCUMENTS

| 27698 | 5/1993 | (JP) . |
|---|---|---|
| 115559 | 5/1995 | (JP) . |
| 7115559 | 5/1995 | (JP) . |
| 194444 | 7/1996 | (JP) . |
| 8194444 | 7/1996 | (JP) . |

OTHER PUBLICATIONS

\* This Japanese reference is mentioned on pp. 1 and 2 of applicant's specification which constitutes a concise statement of relevance.

*Primary Examiner*—Sherrie Hsia
(74) *Attorney, Agent, or Firm*—Jordan and Hamburg LLP

(57) ABSTRACT

A method of automatically adjusting a CRT color monitor screen and a CRT color monitor are provided in which the horizontal position and size in a horizontal frequency of 100 kHz or so are adjusted at an acceptable accuracy thus reducing the overall cost by steps of examining with a comparison circuit 6, a one-shot circuit 7, and a microcomputer 9 whether a location determining pulse overlaps with a synthetic signal or not while shifting the phase of the location determining pulse in relation to a horizontal synchronizing signal HD, detecting the location of picture signal part of a video signal relative to the horizontal synchronizing signal HD from the result of examination, and automatically adjusting the horizontal position and the horizontal size on the screen in accordance with the result of detection.

6 Claims, 12 Drawing Sheets

METHOD OF AUTOMATICALLY ADJUSTING A CRT COLOR MONITOR SCREEN AND A CRT COLOR MONITOR

BACKGROUND OF THE INVENTION

1. Field of the Invention

The present invention relates to a method of automatically adjusting a CRT color monitor screen and to a CRT color monitor. More particularly, the present invention relates to a method of automatically adjusting position and size on a CRT color monitor screen in accordance with an unknown input video signal and to a CRT color monitor employing the method.

2. Description of the Prior Art

Such conventional methods of automatically adjusting a CRT color monitor screen are well known and two techniques of them are disclosed in Japanese Patent Laid-open Publications No. HEI5-27689/1993 and No. HEI8-194444/1996.

The technique disclosed in HEI5-27689/1993 has a timer built in a microcomputer assigned for measuring a beginning of a picture signal part of a video signal to perform an automatic screen position adjusting operation.

The technique disclosed in HEI8-194444/1996 permits a measuring circuit with a counter for counting clocks to measure the beginning and an end of the picture signal part of the video signal and uses a result of the measurement in a microcomputer for automatic adjusting of position and size on the screen.

However, in the technique disclosed in HEI5-27689/1993, the timer built in the microcomputer provided for measuring the beginning of the picture signal part is low in the resolution of time. Assuming that the horizontal frequency is 100 kHz, the accuracy of measurement will be declined thus providing a lower accuracy in adjusting the horizontal position.

In the technique disclosed in HEI8-194444/1996, the measuring circuit is operable at a high speed and provides a high accuracy of measurement when the horizontal frequency is 100 kHz or so hence ensuring a higher accuracy in adjusting the horizontal position. The use of the high speed operable measuring circuit will however increase the overall cost.

SUMMARY OF THE INVENTION

It is thus an object of the present invention to provide a method of automatically adjusting a CRT color monitor screen and a CRT color monitor in which the position and size in the horizontal frequency of 100 kHz or so are adjusted at an acceptable accuracy thus permitting the use of an inexpensive microcomputer and reducing the overall cost.

As a first feature of the present invention, it provides a method of automatically adjusting a CRT color monitor screen comprising the steps of: examining whether a location determining pulse overlaps with a picture signal part of a video signal or not while a phase of the location determining pulse is being shifted in relation to a horizontal or vertical synchronizing signal; detecting a location of the picture signal part relative to the horizontal or vertical synchronizing signal from the result of examination; and automatically adjusting at least one of horizontal position, vertical position, horizontal size, and vertical size on the screen according to the result of detection.

In the method of automatically adjusting a CRT color monitor screen according to the first feature of the present invention, when an unit of the phase shift of the location determining pulse is minimized, the accuracy of measurement can be high with the horizontal frequency of e.g. 100 kHz or so. If the shifting unit is 20 nanoseconds, the accuracy of measurement is 2% at 100 kHz of the horizontal frequency. The shifting unit can be minimized by scaling adjustment in a D/A conversion which is implemented with an inexpensive microcomputer. Also, since there is no need for detecting the state of a signal with the use of a fast sampling pulse, the inexpensive microcomputer can conduct all substantial tasks thus eliminating the use of such a high speed operable measuring circuit. Consequently, the accuracy in adjusting the position and size when the horizontal frequency is 100 kHz or so will be acceptable and the overall cost will successfully be reduced.

As a second feature of the present invention, it provides a CRT color monitor comprising: a picture signal part location detecting means for examining whether a location determining pulse overlaps with the picture signal part of a video signal or not while a phase of the location determining pulse is being shifted in relation to a horizontal synchronizing signal, and detecting a location of the picture signal part relative to the horizontal synchronizing signal from the result of examination; and an automatic position/size adjusting means for automatically adjusting horizontal position and size on a screen responsive to the result of detection of the picture signal part location detecting means.

In the CRT color monitor according to the second feature of the present invention, when the unit of the phase shift of the location determining pulse is minimized, the accuracy of measurement can be high with the horizontal frequency of e.g. 100 kHz or so. If the shifting unit is 20 nanoseconds, the accuracy of measurement is 2% at 100 kHz of the horizontal frequency. The shifting unit can be minimized by scaling adjustment in a D/A conversion which is implemented with an inexpensive microcomputer. Also, since there is no need for detecting the state of a signal with the use of a fast sampling pulse, the inexpensive microcomputer can conduct all substantial tasks thus eliminating the use of such a high speed operable measuring circuit. Consequently, the accuracy in adjusting the position and size when the horizontal frequency is 100 kHz or so will be acceptable and the overall cost will successfully be reduced.

As a third feature of the present invention, it provides a CRT color monitor according to the second feature, wherein the picture signal part location detecting means comprises: a comparison circuit for producing two different state outputs which represent overlap and non overlap respectively between the location determining pulse and the picture signal part; a one-shot circuit for producing a pulse signal of a specific time width which is determined by a change from the non overlap state to the overlap state between the location determining pulse and the picture signal part; and a microcomputer for, while monitoring whether the pulse signal of the one-shot circuit is produced or not, shifting the phase of the location determining pulse in a direction for delaying from the horizontal synchronizing signal and, when the pulse signal is produced, assigning the current phase of the location determining pulse to the beginning of the picture signal part, and for, while monitoring whether the pulse signal of the one-shot circuit is produced or not, shifting the phase of the location determining pulse in a direction for advancing from the horizontal synchronizing signal and, when the pulse signal is produced, assigning the current phase of the location determining pulse to the end of the picture signal part.

In the CRT color monitor according to the third feature of the present invention, the comparison circuit and the one-shot circuit are added to the microcomputer then decreasing the load of operations on the microcomputer. On the other hand, the addition of the two circuits will require only a small extra cost.

As a fourth feature of the present invention, it provides a CRT color monitor according to the second or third feature, wherein the location determining pulse is a pulse signal synchronous with a collector pulse which is applied by a deflection circuit to a defecting coil.

In the CRT color monitor according to the fourth feature of the present invention, the pulse signal synchronous with the collector pulse applied by the deflection circuit to the deflecting coil is used as the location determining pulse. This allows the phase of the location determining pulse to be shifted using such an inherent arrangement of the CRT color monitor which shifts the phase of the collector pulse, hence simplifying the entire arrangement.

As a fifth feature of the present invention, it provides a CRT color monitor according to the second to fourth feature, wherein the automatic position/size adjusting means incorporates a microcomputer for measuring a horizontal frequency, retrieving reference horizontal position data and reference horizontal size data relative to the horizontal frequency, which have been prepared and stored, and calculating and outputting a horizontal position adjusting data and a horizontal size adjusting data from the retrieved reference horizontal position and size data and the result of detection of the picture signal part location detecting means, and a horizontal deflection circuit is adapted for adjusting the phase of the collector pulse applied to the deflecting coil in accordance with to the horizontal position adjusting data to define the horizontal position on the screen and for adjusting the amplitude of the collector pulse in accordance with to the horizontal size adjusting data to define the horizontal size on the screen.

In the CRT color monitor according to the fifth feature of the present invention, the horizontal position adjusting data and horizontal size adjusting data are calculated using the reference horizontal position data and reference horizontal size data, which have been recorded, as well as the result of detection from the picture signal part location detecting means. This permits any extra correction corresponding to the horizontal frequency.

DETAILED DESCRIPTION OF THE INVENTION

The present invention will be described in more detail referring to illustrated embodiments which are of no limitations.

Figure 1:
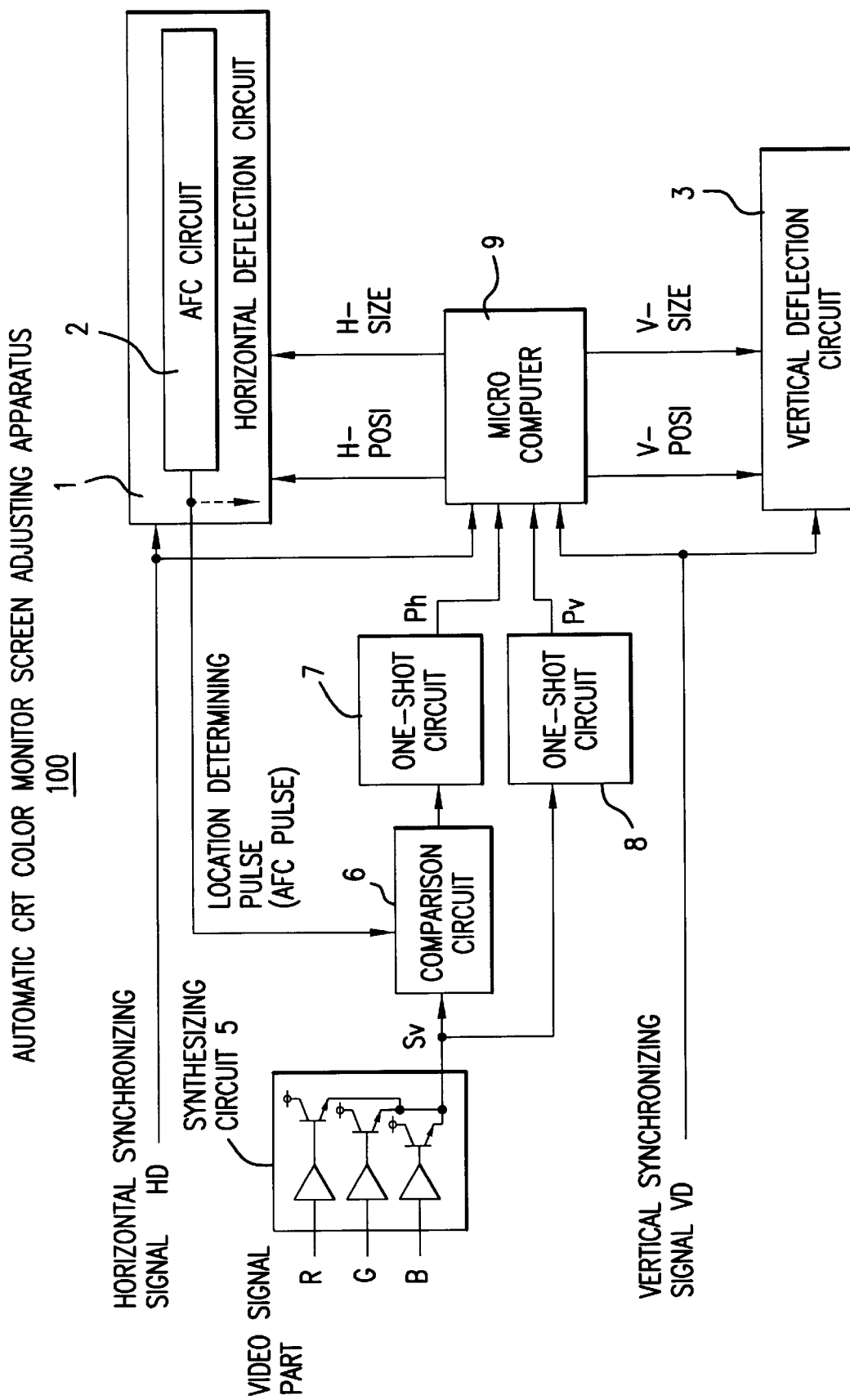
FIG. 1 is a circuitry diagram of an automatic CRT color monitor screen adjusting apparatus according to one embodiment of the present invention.

FIG. 1 is a circuitry diagram of an automatic CRT color monitor screen adjusting apparatus 100 according to one embodiment of the present invention.

The automatic CRT color monitor screen adjusting apparatus 100 is comprised of a horizontal deflection circuit 1 for controlling a horizontal deflection by providing a collector pulse to a deflecting coil and for adjusting a horizontal position of a screen by controlling a phase of the collector pulse in response to a horizontal position adjusting data H-POSI and for adjusting a horizontal size of the screen by controlling an amplitude of the collector pulse in response to a horizontal size adjusting data H-SIZE, an AFC circuit 2 included in the horizontal deflection circuit 1 for producing a location determining pulse (AFC pulse) having a phase and a width (for example, 2 microseconds) as same as the collector pulse, a vertical deflection circuit 3 for controlling a vertical deflection and for adjusting a vertical position of the screen by controlling a DC level of a vertical deflection current in response to a vertical position adjusting data V-POSI and for adjusting a vertical size of the screen by controlling an amplitude of the vertical deflection current in response to a vertical size adjusting data V-SIZE, a synthesizing circuit 5 for producing a synthetic signal Sv by logical addition of R, G and B video signals, a comparison circuit 6 for producing an "H" output when the location determining pulse overlaps to the synthetic signal Sv and producing an "L" output when the location determining pulse don't overlap to the synthetic signal Sv, a first one-shot circuit (re-triggerable monostable multivibrator) 7 for producing a pulse signal Ph having a specific width (for example, 100 milliseconds) when the output of the comparison circuit 6 changed from "L" to "H", a second one-shot circuit (re-triggerable monostable multivibrator) 8 for producing a pulse signal Pv having a specific width (for example, 70 microseconds) at a leading edge (beginning) of the synthetic signal Sv, and a microcomputer 9.

The microcomputer 9 produces the horizontal position adjusting data H-POSI for varying the phase of the collector pulse (thus, the phase of the location determining pulse) relative to a horizontal synchronizing signal HD while monitoring whether the pulse signal Ph is produced or not. When the pulse signal Ph is produced, the beginning and an end locations of the picture signal part relative to the horizontal synchronizing signal HD are detected. Then, the microcomputer 9 measures a horizontal frequency from the horizontal synchronizing signal HD, retrieves a reference horizontal position data and a reference horizontal size data for the horizontal frequency which have been stored in advance, and calculates the horizontal position adjusting data H-POSI and the horizontal size adjusting data H-SIZE from the result of the detection. In addition, the microcomputer 9 detects the beginning and an end locations of the picture signal part relative to a vertical synchronizing signal VD by using a built-in timer. And, the microcomputer 9 measures a vertical frequency from the vertical synchronizing signal VD, retrieves a reference vertical position data and a reference vertical size data for the vertical frequency which have been stored in advance, and calculates the vertical position adjusting data V-POSI and the vertical size adjusting data V-SIZE from the result of the detection.

Figure 2:
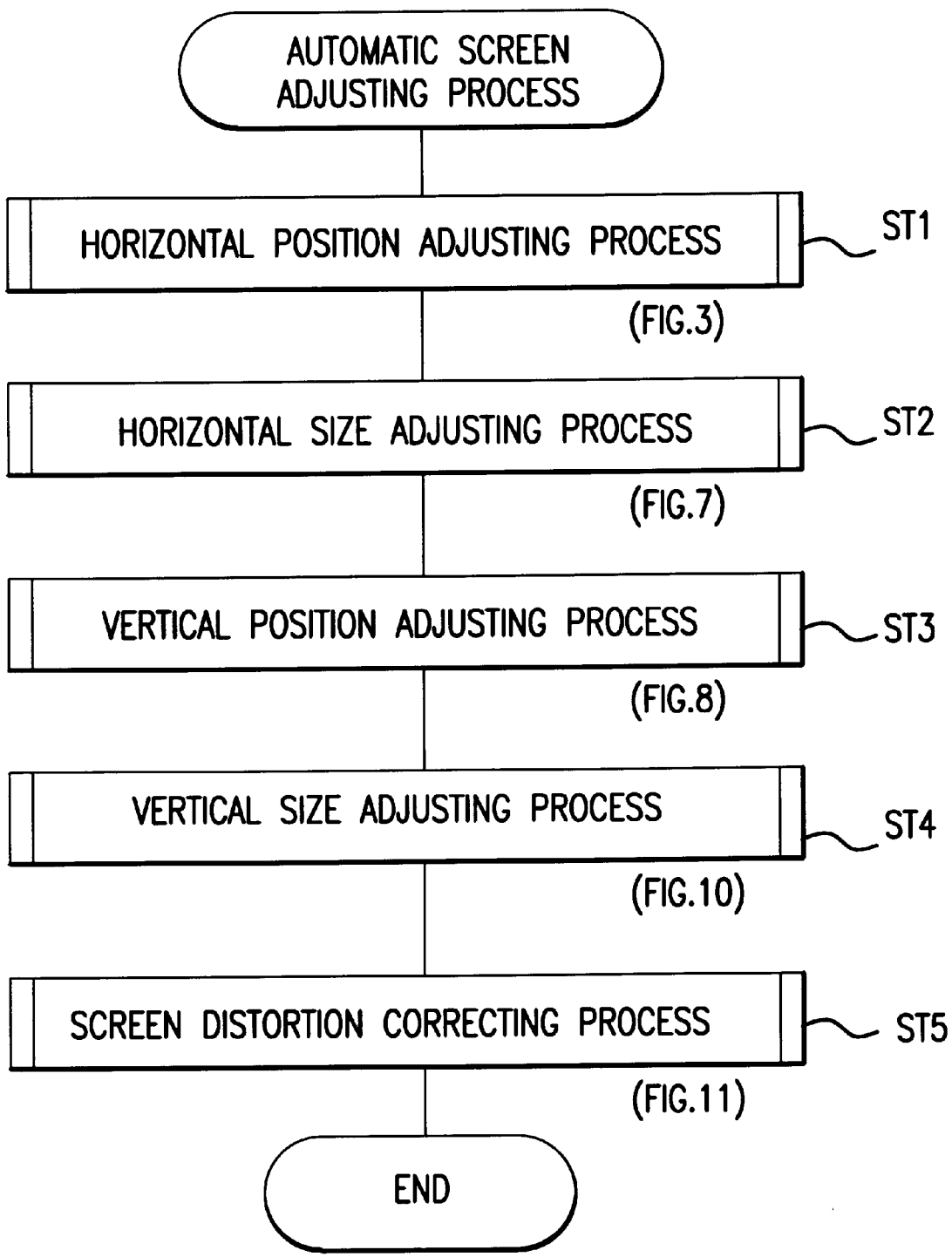
FIG. 2 is a flowchart showing a procedure of automatic screen adjusting process of the apparatus shown in FIG. 1.

FIG. 2 is a flowchart showing processing steps in the automatic CRT color monitor screen adjusting apparatus 100.

At Step ST1, a horizontal position adjusting process is carried out for producing the horizontal position adjusting data H-POSI. The horizontal position adjusting process will be described later referring to FIG. 3.

At Step ST2, a horizontal size adjusting process is carried out for producing the horizontal size adjusting data H-SIZE. The horizontal size adjusting process will be described later referring to FIG. 7.

At Step ST3, a vertical position adjusting process is carried out for producing the vertical position adjusting data V-POSI. The vertical position adjusting process will be described later referring to FIG. 8.

At Step ST4, a vertical size adjusting process is carried out for producing the vertical size adjusting data V-SIZE. The vertical size adjusting process will be described later referring to FIG. 10.

At Step ST5, a screen distortion correcting process is carried out for outputting a distortion correcting parameter. The screen distortion correcting process will be described later referring to FIG. 11.

Figure 3:
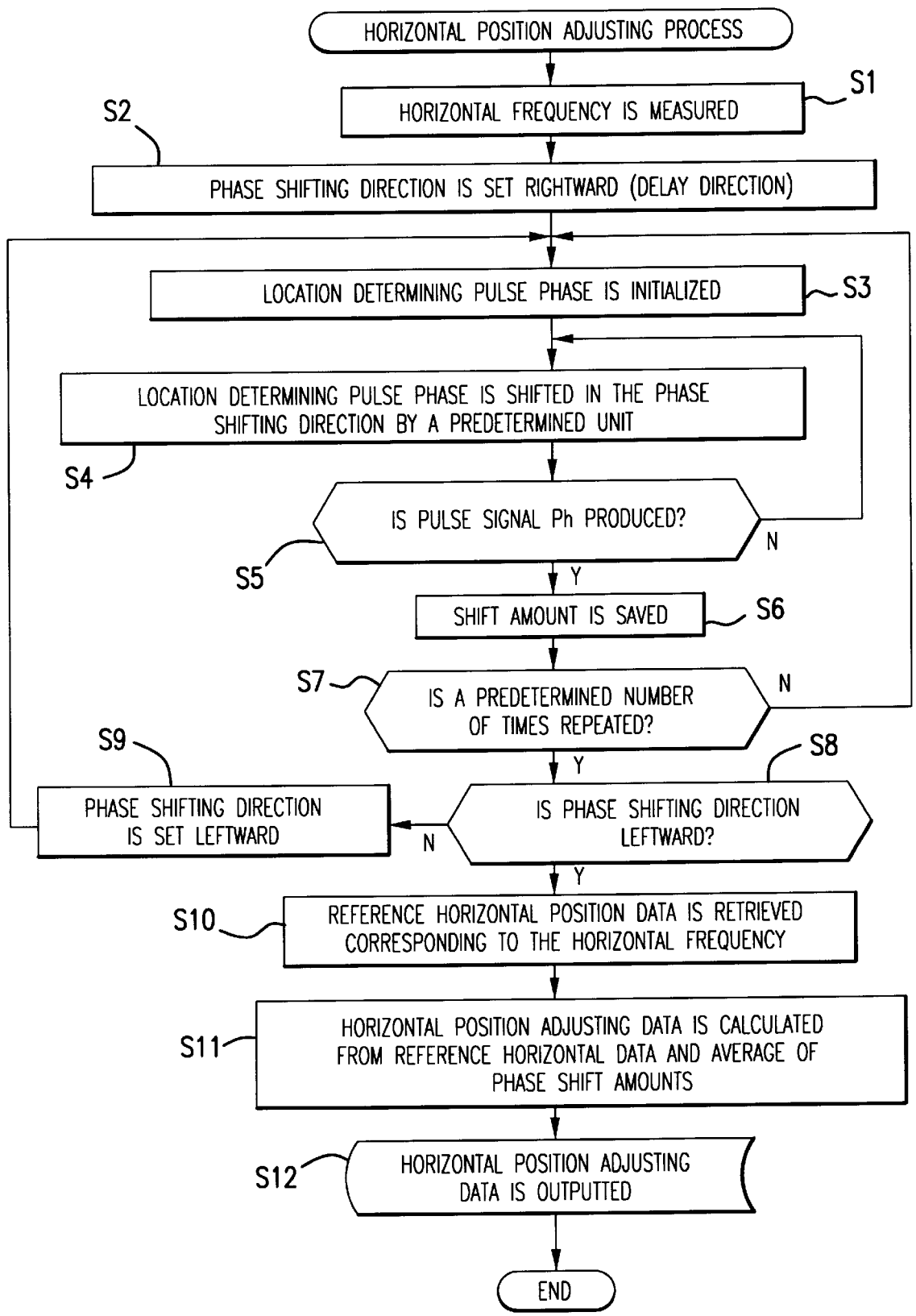
FIG. 3 is a flowchart showing a procedure of horizontal position adjusting process of the apparatus shown in FIG. 1.

FIG. 3 is a flowchart showing the horizontal position adjusting process executed in the microcomputer 9.

Figure 4:
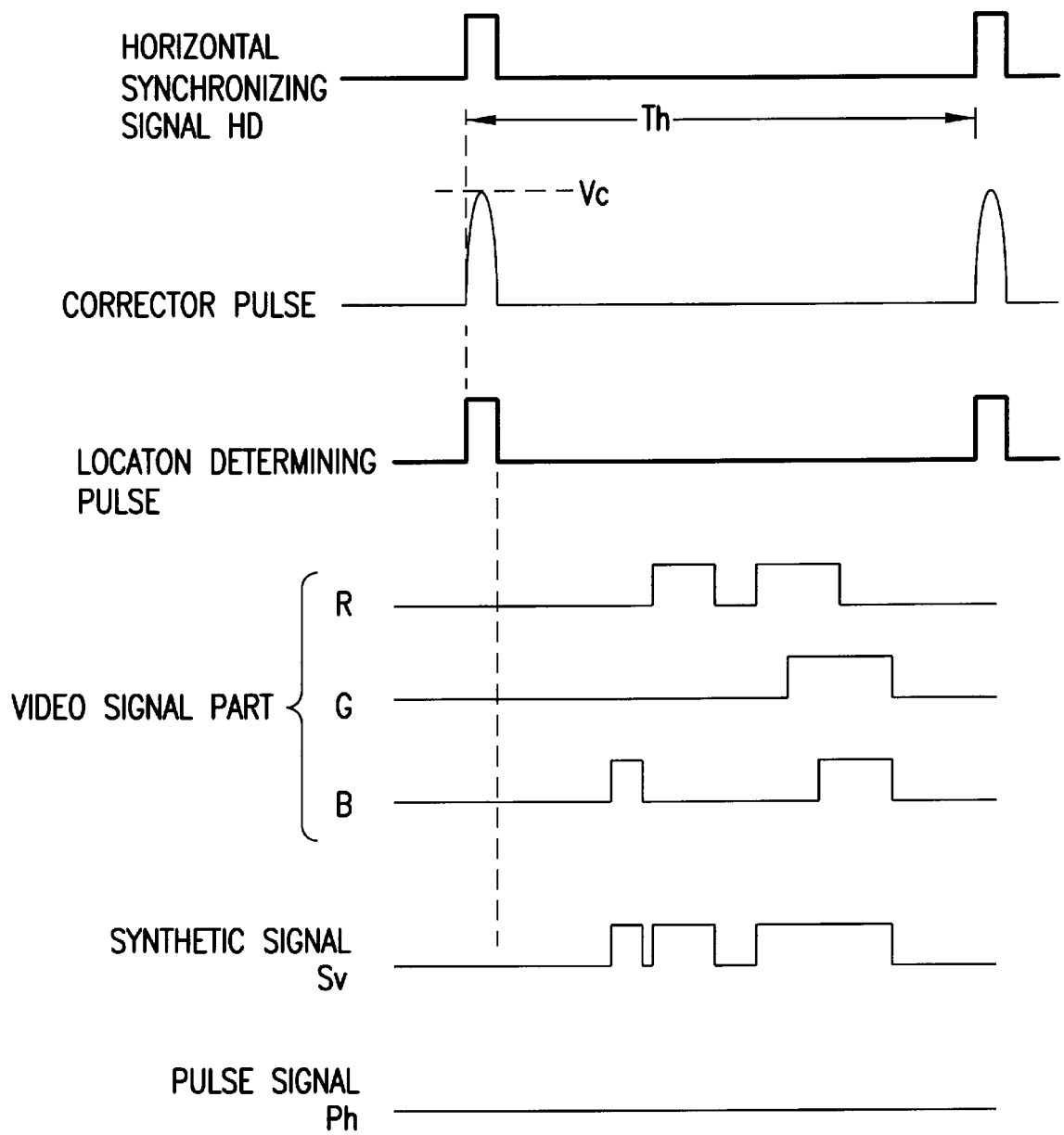
FIG. 4 is a time chart showing an initialized phase of a location determining pulse.

At Step S1, the horizontal frequency is measured from the horizontal synchronizing signal HD. More particularly, the period Th of the horizontal synchronizing signal HD is detected as shown in FIG. 4 and the horizontal frequency is calculated from the period Th.

At Step S2, the phase shifting direction of the collector pulse or of the location determining pulse relative to the horizontal synchronizing signal HD (referred to as a location determine pulse phase hereinafter) is set rightward(for delay direction).

At Step S3, the location determining pulse phase is initialized. More specifically, the horizontal position adjusting data H-POSI is tailored so that the location determining pulse phase is in phase with the horizontal synchronizing signal HD as shown in FIG. 4.

At Step S4, the horizontal position adjusting data H-POSI is produced so that the location determining pulse phase is shifted in the phase shifting direction by a predetermined unit (for example, 20 nanoseconds).

At Step S5, it is examined whether the pulse signal Ph changed to H level or not. If the signal is at L level, the procedure goes back to Step S4. When the signal is changed to H level, the procedure moves to Step S6.

Figure 5:
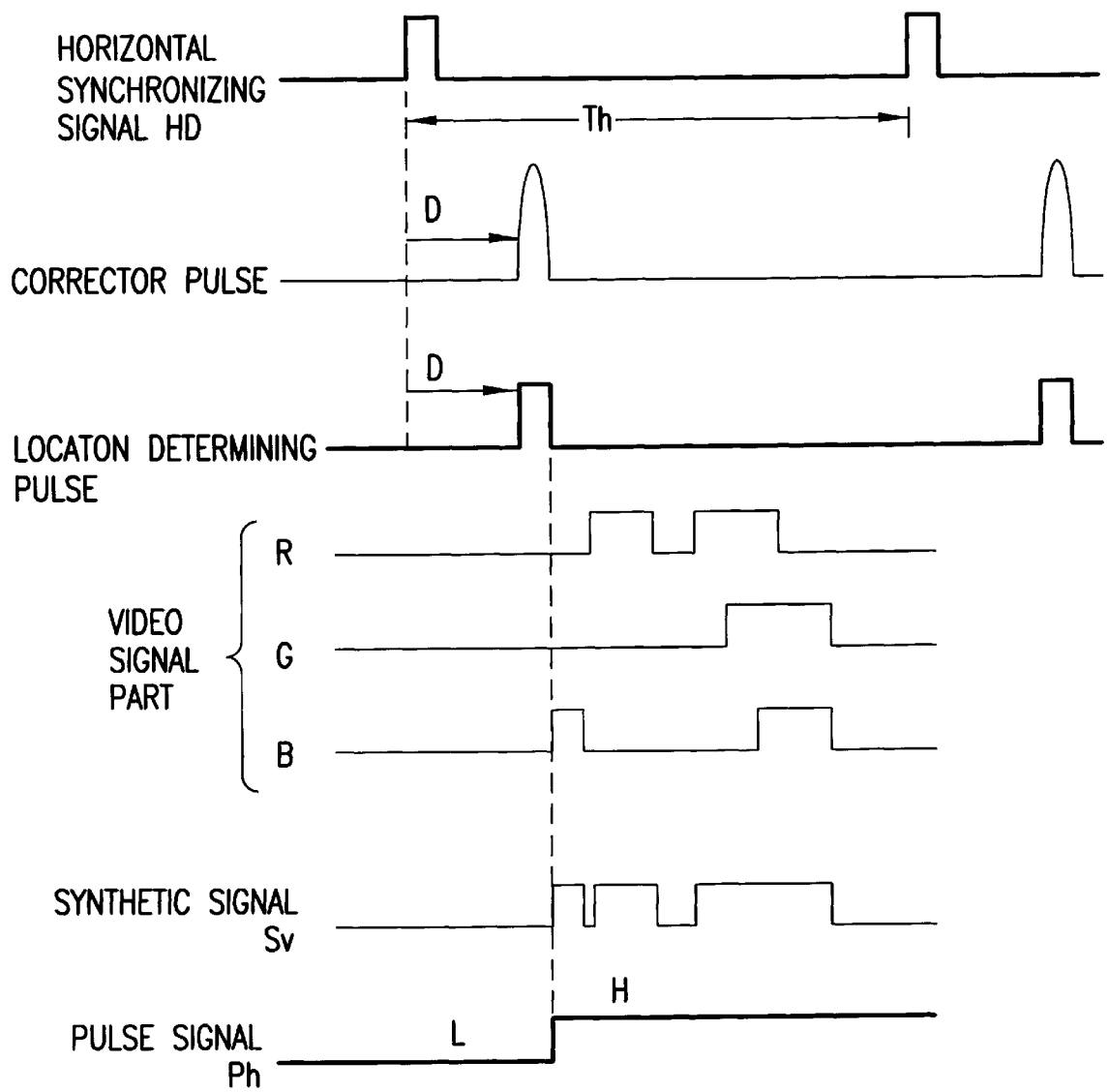
FIG. 5 is a time chart showing an overlap between the location determining pulse and a beginning of a synthetic signal.
Figure 6:
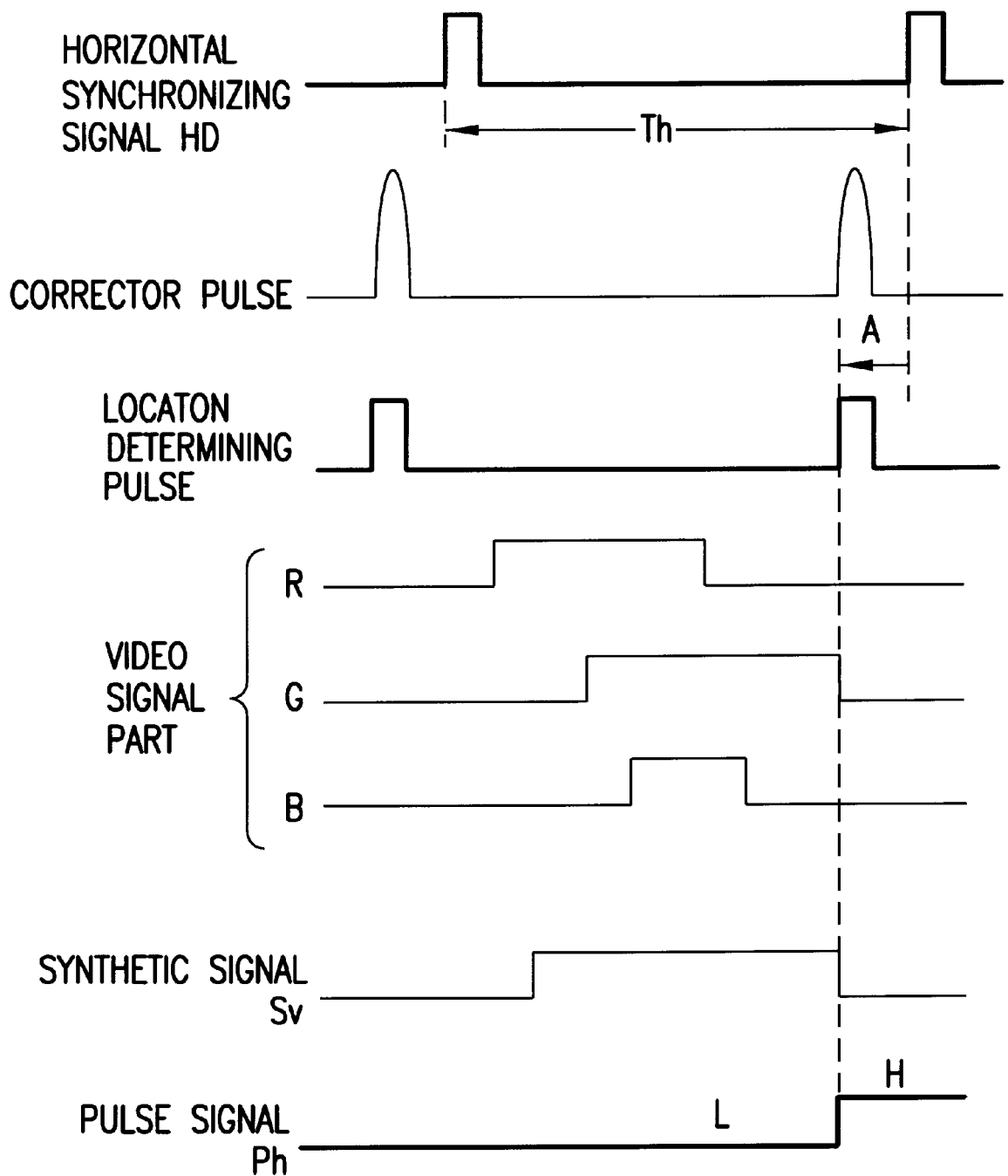
FIG. 6 is a time chart showing an overlap between the location determining pulse and an end of the synthetic signal.

When the rear end of the location determining pulse at least partially overlaps the front end of the synthetic signal Sv through repeating Steps S4 and S5 in case that the phase shifting direction is rightward as shown in FIG. 5, the pulse signal Ph is turned to H level. When the front end of the location determining pulse partially overlaps the rear end of the synthetic signal Sv in case that the phase shifting direction is leftward as shown in FIG. 6, the pulse signal Ph is turned to H level.

At Step S6, a shift amount is saved at the pulse signal Ph turning to H level. This shift amount represents a delay D shown in FIG. 5 or an advance A shown in FIG. 6.

At Step S7, the succession of Steps S3 to S6 is repeated a predetermined number of times (for example, three times) and the procedure goes to Step S8.

At Step S8, it is examined whether the phase shift to the left has been finished or not. If not, the procedure moves to Step S9 and when yes, to Step S10.

At Step S9, the phase shift direction of the location determining pulse relative to the horizontal synchronizing signal HD is set leftward (lead direction) and the procedure returns to Step S3.

At Step S10, a desired one of the reference horizontal position data stored in advance is retrieved corresponding to the horizontal frequency measured at Step S1.

At Step S11, the horizontal position adjusting data H-POSI is calculated from the reference horizontal position data retrieved, an average of the rightward phase shift amounts saved in Step S6, and an average of the leftward phase shift amounts saved in Step S6. For example, in case of the reference horizontal position data means that synthetic signal Sv should locate in the center of the horizontal synchronizing signal HD, the horizontal position adjusting data H-POSI may be determined so that the phase delay of the location determining pulse relative to the horizontal synchronizing signal HD is expressed as D−(D+W−A)/2. Here, W is a width of the location determining pulse.

At Step S12, the horizontal position adjusting data H-POSI is outputted and the procedure is terminated.

Figure 7:
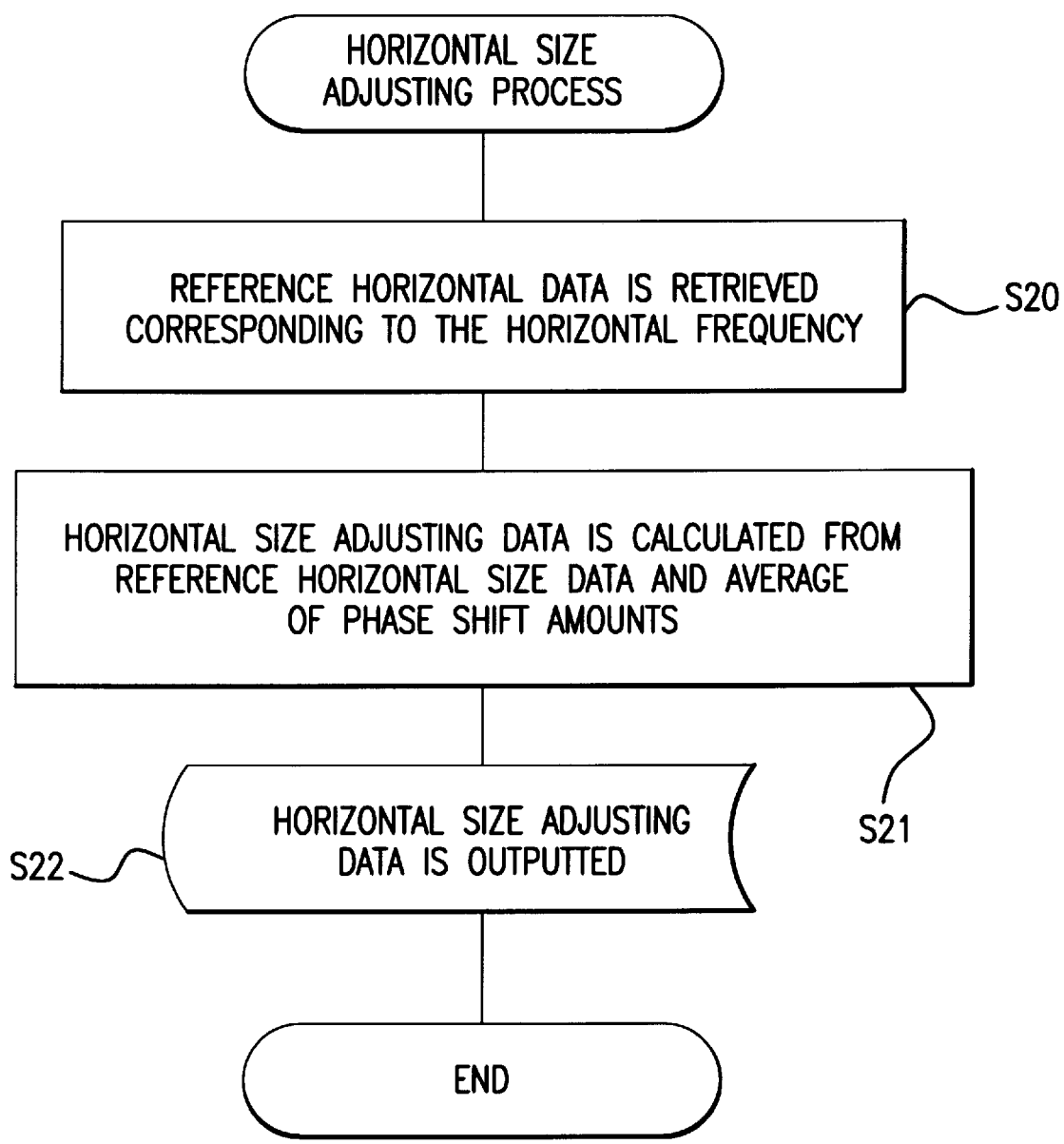
FIG. 7 is a flowchart showing a procedure of horizontal size adjusting process of the apparatus shown in FIG. 1.

FIG. 7 is a flowchart showing the horizontal size adjusting process executed in the microcomputer 9.

At Step S20, a desired one of the reference horizontal size data stored in advance is retrieved corresponding to the horizontal frequency measured at Step S1.

At Step S21, the horizontal size adjusting data H-SIZE is calculated from the reference horizontal size data retrieved, an average of the rightward phase shift amounts saved in Step S6, and an average of the leftward phase shift amounts saved in Step S6. For example, the horizontal size adjusting data H-SIZE may be determined so that the amplitude Vc of the collector pulse is increased when (Th−D−A)/Th is small and decreased when it is large so as to make the screen size equal to the reference horizontal size.

At Step S22, the horizontal size adjusting data H-SIZE is outputted and the procedure is terminated.

Accordingly, the horizontal position and the horizontal size in the screen can automatically be adjusted by the prescribed horizontal position and size adjusting processes, thus requiring no or less manual adjusting actions of an operator.

Figure 8:
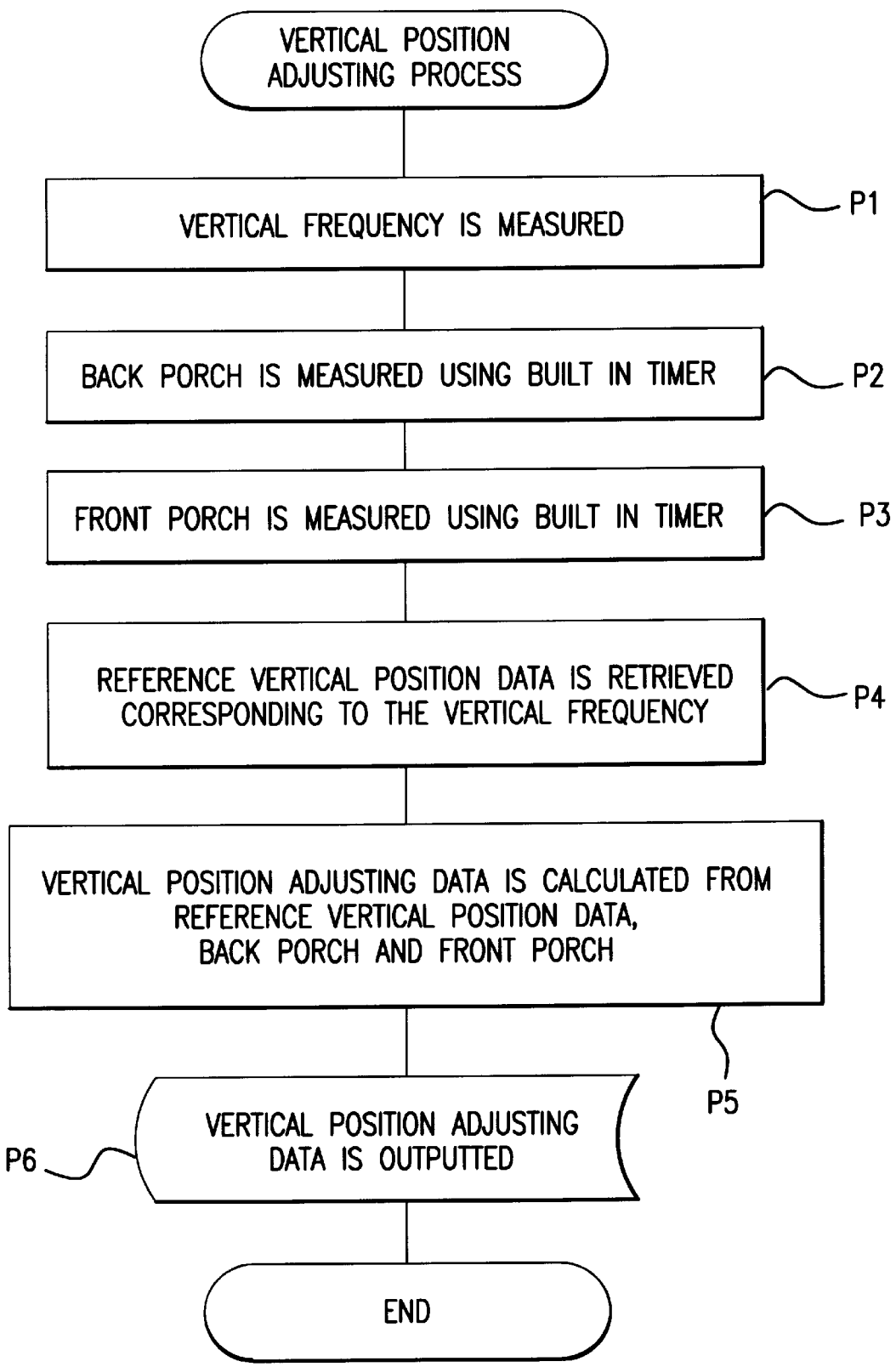
FIG. 8 is a flowchart showing a procedure of vertical position adjusting process of the apparatus shown in FIG. 1.

FIG. 8 is a flowchart showing the vertical position adjusting process executed in the microcomputer 9.

Figure 9:
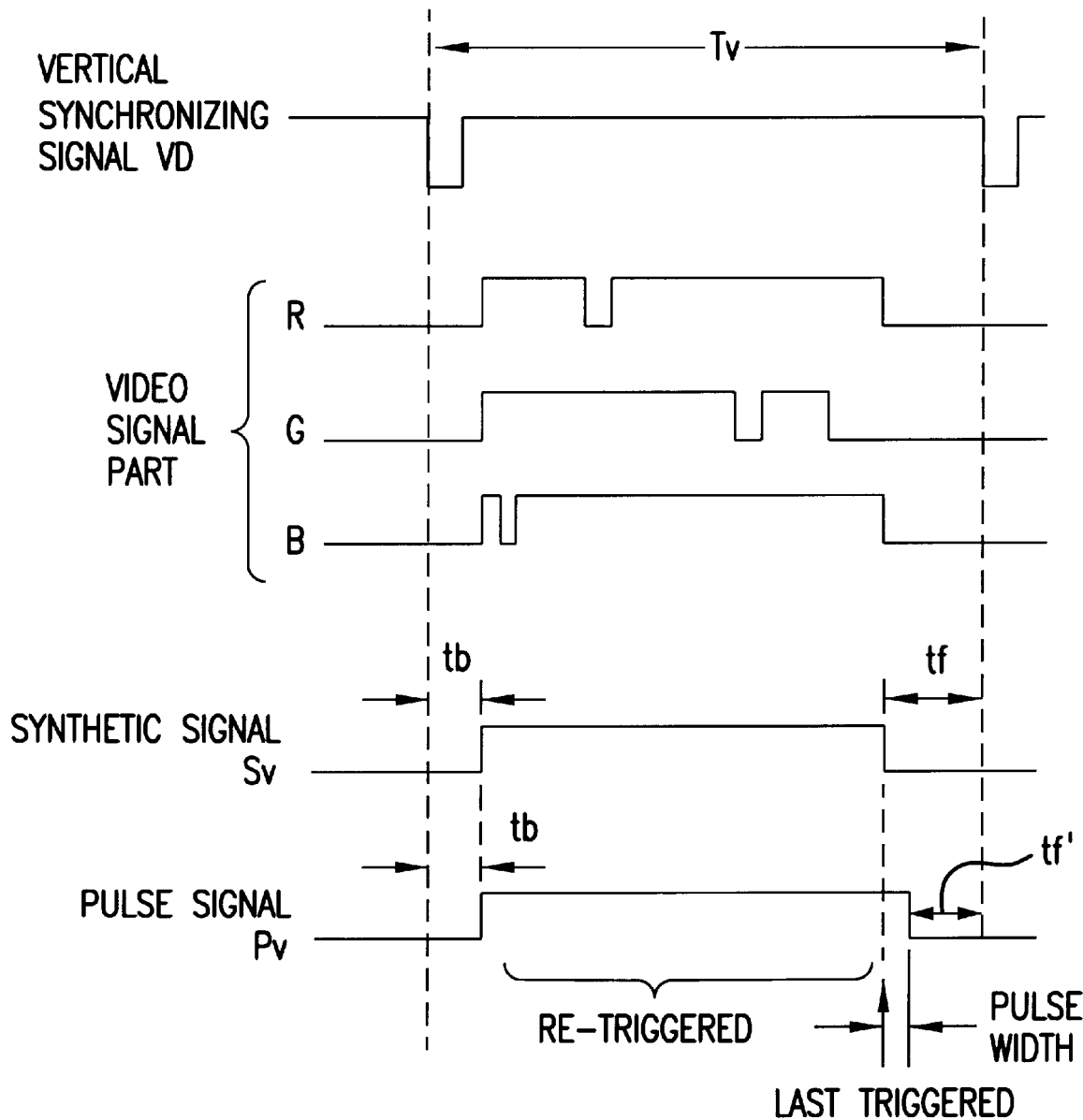
FIG. 9 is a time chart showing a back porch and a front porch.

At Step P1, the vertical frequency is measured from the vertical synchronizing signal VD. More specifically, the period Tv of the vertical synchronizing signal VD is detected as shown in FIG. 9 and the vertical frequency is determined from the period Tv.

At Step P2, the time width from the vertical synchronizing signal VD to the beginning of the pulse signal Pv or a back porch tb (shown in FIG. 9) is measured using the built-in timer. Since the vertical frequency is as low as 100 Hz, the use of the built-in timer may not impair the accuracy. This measurement may be repeated several times to have an average tb of the back porch measurements.

At Step P3, the time width tf (shown in FIG. 9) from the vertical synchronizing signal VD to the end of the pulse signal Pv is measured with the built-in timer and subtracted by a pulse width of the one-shot circuit 8 to determine a front porch tf. This measurement may be repeated several time to have an average tf of the front porch measurements.

At Step P4, a desired one of the reference vertical position data stored in advance is retrieved corresponding to the vertical frequency measured at Step P1.

At Step P5, the vertical position adjusting data V-POSI is calculated from the reference vertical position data retrieved, the back porch tb measured at Step P2, and the front porch tf measured at Step P3. For example, in case of the reference vertical position data means that synthetic signal Sv should locate in the center of the vertical synchronizing signal VD, the vertical position adjusting data V-POSI may be determined so that the phase delay of the synthetic signal Sv relative to the vertical synchronizing signal VD is expressed as tb−(tb−tf)/2 or namely, the DC level of the vertical deflection current is adjusted to an optimum.

At Step P6, the vertical position adjusting data V-POSI is outputted and the procedure is terminated.

Figure 10:
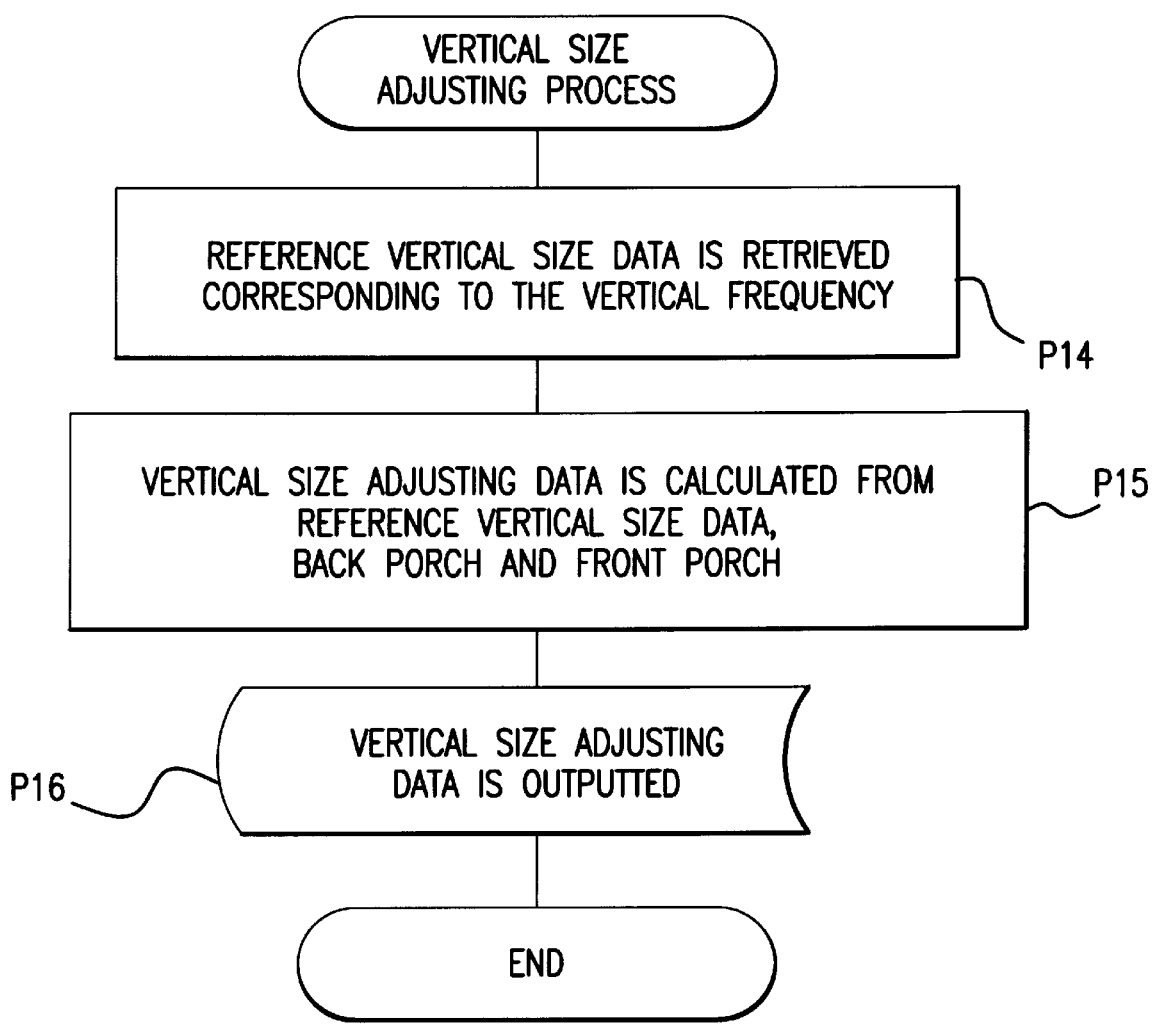
FIG. 10 is a flowchart showing a procedure of vertical size adjusting process of the apparatus shown in FIG. 1.

FIG. 10 is a flowchart showing the vertical size adjusting process executed in the microcomputer 9.

At Step P14, a desired one of the reference vertical size data stored in advance is retrieved corresponding to the vertical frequency measured at Step P1.

At Step P15, the vertical size adjusting data V-SIZE is calculated from the reference vertical size data retrieved, the back porch tb measured in Step P2, and the front porch tf measured in Step P3. For example, the vertical size adjusting data V-SIZE may be determined so that the amplitude of the vertical deflection current is increased when (Tv−tb−tf)/Tv is small and decreased when it is large.

At Step P16, the vertical size adjusting data V-SIZE is outputted and the procedure is terminated.

Figure 11:
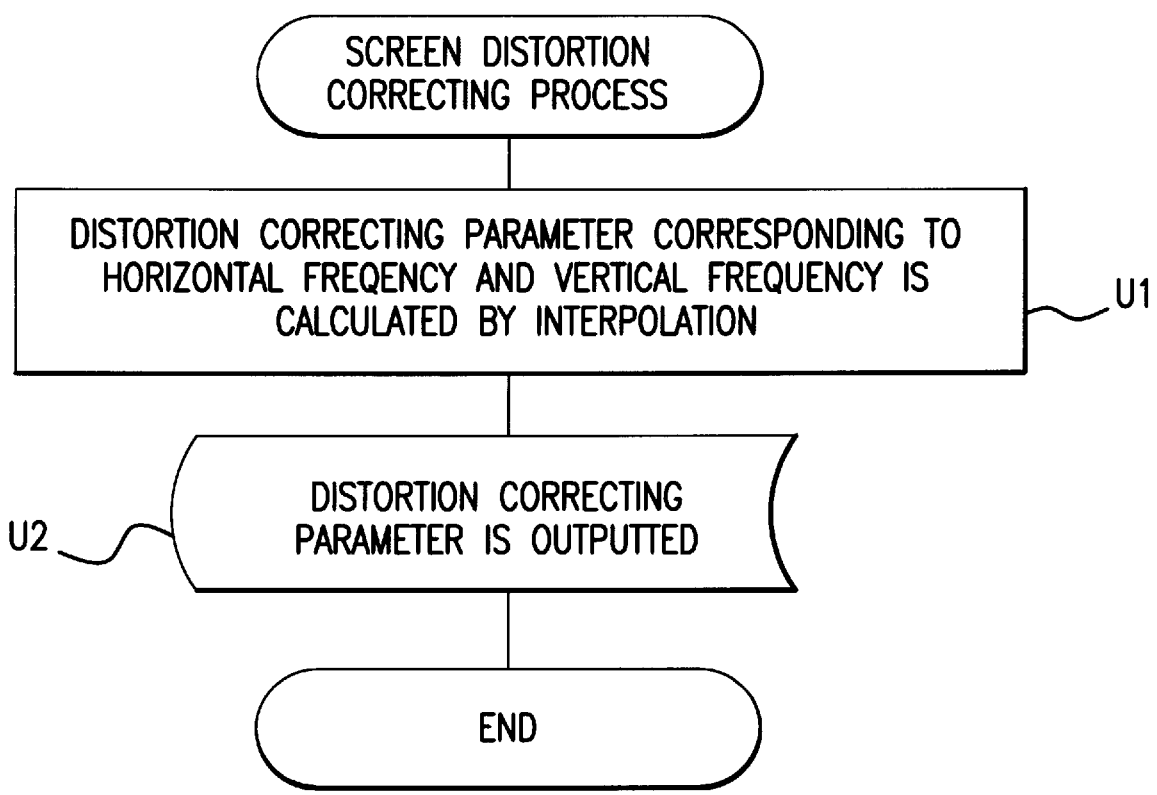
FIG. 11 is a flowchart showing a procedure of screen distortion correcting process of the apparatus shown in FIG. 1.

FIG. 11 is a flowchart showing the screen distortion correcting process executed in the microcomputer 9.

Figure 12:
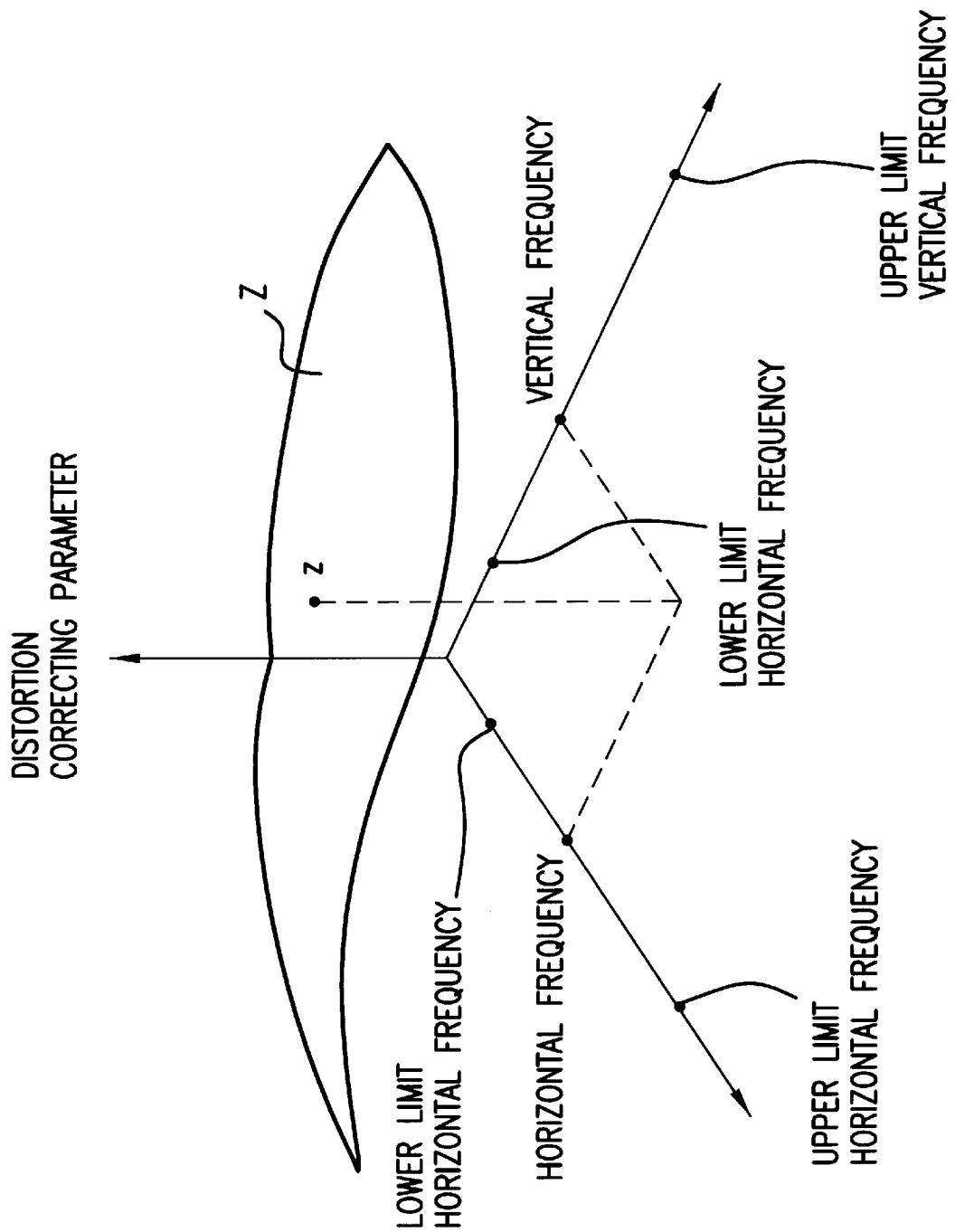
FIG. 12 is an explanatory view showing interpolation for calculating a distortion correction parameter.

At Step U1, the distortion correcting parameter corresponding to the horizontal frequency and the vertical frequency is calculated by interpolation. The interpolation may be conducted by determining a point z on the interpolation curved surface Z shown in FIG. 12.

At Step U2, the distortion correcting parameter is outputted and the procedure is terminated.

As set forth above, in the automatic CRT color monitor screen adjusting apparatus 100, when the phase shift unit of the location determining pulse is sufficiently small, the accuracy of measurement will remain high with the horizontal frequency e.g. 100 kHz or so. The small phase shift unit can be implemented by scaling adjusting over a D/A converter installed in the microcomputer 9 of a common version which is inexpensive. Since the phase shift of the location determining pulse has to be conducted at not such a high speed, no extra measurement circuits for high speed operation are needed, hence permitting the use of an inexpensive version of the microcomputer 9. For example, the accuracy of the position and size adjusting is found acceptable over the horizontal frequency of 100 kHz or so, thus declining the overall cost.

Also, the automatic CRT color monitor screen adjusting apparatus 100 has the comparison circuit 6 and the one-shot circuit 7 provided plus the microcomputer 9 hence reducing the load on the microcomputer 9. The two circuits 6 and 7 will cost less giving a small extra. As the location determining pulse is synchronized with the collector pulse applied by the horizontal deflection circuit 1 to the horizontal deflecting coil, its phase can be shifted with the use of an inherent or simpler arrangement of the horizontal deflection circuit 1 for shifting the phase of the collector pulse. Thus the overall cost can be reduced. Since the horizontal position adjusting data, horizontal size adjusting data, vertical position adjusting data, and vertical size adjusting data are calculated from the reference horizontal position data, reference horizontal size data, reference vertical position data, and reference vertical size data which have been predetermined and stored, their corrections can be obtained corresponding to the horizontal frequency and the vertical frequency. Moreover, the correction for distortion can be made depending on the horizontal frequency and the vertical frequency.

The present invention provides a method of automatically adjusting a CRT color monitor screen and a CRT color monitor in which the position and size in the horizontal frequency of 100 kHz or so are adjusted at an acceptable accuracy thus permitting the use of an inexpensive computer and reducing the overall cost.

What is claimed is:

1. A method of automatically adjusting a CRT color monitor screen comprising the steps of:

examining whether a location determining pulse overlaps with a picture signal part of a video signal or not while a phase of the location determining pulse is being shifted in relation to a horizontal or vertical synchronizing signal;

detecting a location of the picture signal part relative to the horizontal or vertical synchronizing signal from the result of examination; and automatically adjusting at least one of horizontal position, vertical position, horizontal size, and vertical size on the screen according to the result of detection.

2. A CRT color monitor comprising:

a picture signal part location detecting means for examining whether a location determining pulse overlaps with the picture signal part of a video signal or not while a phase of the location determining pulse is being shifted in relation to a horizontal synchronizing signal, and detecting a location of the picture signal part relative to the horizontal synchronizing signal from the result of examination; and an automatic position/size adjusting means for automatically adjusting horizontal position and size on a screen responsive to the result of detection of the picture signal part location detecting means.

3. A CRT color monitor according to claim 2, wherein the picture signal part location detecting means comprises:

a comparison circuit for producing two different state outputs which represent overlap and non overlap respectively between the location determining pulse and the picture signal part;

a one-shot circuit for producing a pulse signal of a specific time width which is determined by a change from the non overlap state to the overlap state between the location determining pulse and the picture signal part; and a microcomputer for, while monitoring whether the pulse signal of the one-shot circuit is produced or not, shifting the phase of the location determining pulse in a direction for delaying from the horizontal synchronizing signal and, when the pulse signal is produced, assigning the current phase of the location determining pulse to the beginning of the picture signal part, and for, while monitoring whether the pulse signal of the one-shot circuit is produced or not, shifting the phase of the location determining pulse in a direction for advancing from the horizontal synchronizing signal and, when the pulse signal is produced, assigning the current phase of the location determining pulse to the end of the picture signal part.

4. A CRT color monitor according to claim 3, wherein the location determining pulse is a pulse signal synchronous with a collector pulse which is applied by a deflection circuit to a defecting coil.

5. A CRT color monitor according to claim 2, wherein the location determining pulse is a pulse signal synchronous with a collector pulse which is applied by a deflection circuit to a defecting coil.

6. A CRT color monitor according to claim 4, wherein the automatic position/size adjusting means incorporates a microcomputer for measuring a horizontal frequency, retrieving reference horizontal position data and reference horizontal size data relative to the horizontal frequency, which have been prepared and stored, and calculating and outputting a horizontal position adjusting data and a horizontal size adjusting data from the retrieved reference horizontal position and size data and the result of detection of the picture signal part location detecting means, and the deflection circuit including a horizontal deflection circuit which is adapted for adjusting the phase of the collector pulse applied to the deflecting coil in accordance with to the horizontal position adjusting data to define the horizontal position on the screen and for adjusting the amplitude of the collector pulse in accordance with to the horizontal size adjusting data to define the horizontal size on the screen.

* * * * *